United States Patent
Jin

(10) Patent No.: US 9,897,186 B2
(45) Date of Patent: Feb. 20, 2018

(54) VEHICULAR DIFFERENTIAL APPARATUS

(71) Applicant: JTEKT CORPORATION, Osaka-shi (JP)

(72) Inventor: He Jin, Kawagoe (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/264,372

(22) Filed: Sep. 13, 2016

(65) Prior Publication Data

US 2017/0082185 A1    Mar. 23, 2017

(30) Foreign Application Priority Data

Sep. 17, 2015   (JP) .................................. 2015-184135

(51) Int. Cl.

| F16H 48/10 | (2012.01) |
|---|---|
| F16H 48/285 | (2012.01) |
| F16H 48/40 | (2012.01) |
| F16H 48/38 | (2012.01) |
| F16H 48/08 | (2006.01) |

(52) U.S. Cl.
CPC ........... *F16H 48/10* (2013.01); *F16H 48/285* (2013.01); *F16H 48/40* (2013.01); *F16H 48/08* (2013.01); *F16H 2048/106* (2013.01); *F16H 2048/387* (2013.01)

(58) Field of Classification Search
None
See application file for complete search history.

(56) References Cited

U.S. PATENT DOCUMENTS

| 5,233,757 A * | 8/1993 | Maguire ................. F16H 48/08 29/893.1 |
|---|---|---|
| 5,453,062 A * | 9/1995 | White .................... F16H 48/285 475/227 |
| 6,053,835 A * | 4/2000 | Shibazaki ............... F16H 48/08 475/160 |
| 8,591,373 B2 * | 11/2013 | Shibagaki ............... F16H 48/08 475/230 |
| 2009/0186739 A1 | 7/2009 | Fujii et al. |

FOREIGN PATENT DOCUMENTS

JP        2009-174577         8/2009

* cited by examiner

*Primary Examiner* — Colby M Hansen
(74) *Attorney, Agent, or Firm* — Oblon, McClelland, Maier & Neustadt, L.L.P.

(57) ABSTRACT

A vehicular differential apparatus includes: a differential case; a first output portion in which a first coupling member and a first side gear mesh with each other via helical teeth; a second output portion in which a second coupling member and a second side gear mesh with each other via helical teeth; and a center washer 30 disposed between the first and second output portions. A clearance through which the first coupling member is movable in an axial direction between the center washer and the first sidewall portion is different in axial width from that through which the first side gear is movable in that direction therebetween. A clearance through which the second coupling member is movable in the axial direction between the center washer and the second sidewall portion is different in axial width from that through which the second side gear is movable in that direction therebetween.

7 Claims, 8 Drawing Sheets

VEHICULAR DIFFERENTIAL APPARATUS

INCORPORATION BY REFERENCE

The disclosure of Japanese Patent Application No. 2015-184135 filed on Sep. 17, 2015 including the specification, drawings and abstract, is incorporated herein by reference in its entirety.

BACKGROUND OF THE INVENTION

1. Field of the Invention

The invention relates to a vehicular differential apparatus that distributes a driving force of a vehicle between paired output shafts with a differential between the output shafts permitted.

2. Description of the Related Art

In the related art, between a right drive shaft and a left drive shaft of a vehicle, a differential apparatus is provided which includes: a differential case to which a driving force generated by a driving source such as an engine is input; a plurality of pinion gears that is rotationally held in the differential case and that is revolved by rotation of the differential case; and a pair of side gears housed coaxially in the differential case so as to be rotatable relative to the differential case, and in which the input driving force is distributed between paired output shafts with differential between the output shafts permitted. Some such differential apparatuses include a differential limiting function to limit differential rotation between the output shafts by a frictional force to enhance straight-ahead traveling capability and thus traveling safety of the vehicle and to enable suppression of idle running (slip) of wheels on low μ roads such as pressed snow roads and muddy roads (see, for example, Japanese Patent Application Publication No. 2009-174577 (JP 2009-174577 A).

In the differential apparatus described in JP 2009-174577 A, a pair of sun gears functioning as the side gears is configured such that each sun gear has two members, namely an inner portion coupled to the corresponding output shaft and an outer portion engaged with a pinion gear (planetary gear), and a thrust force generating mechanism that is helical teeth is provided between the inner portion and the outer portion. In the thrust force generating mechanism, respective thrust forces in opposite directions are generated in the inner portion and the outer portion to increase frictional resistance generated at end surfaces of each of the inner and outer portions in an axial direction. The frictional resistance limits the differential between the output shafts.

A center washer is disposed between the outer portions of the sun gears, and a center washer different from the center washer between the outer portions is disposed between the inner portions of the sun gears.

The differential apparatus described in JP 2009-174577 A has two center washers, which results in an increased number of components and increased assembly man-hours. Thus, a single center washer may be used instead of the two center washers and disposed between the inner portions and between the outer portions of the sun gears. However, in this case, when the inner portion and the outer portion of each sun gear are designed to be identical in axial length as described in JP 2009-174577 A, the differential limiting force may be varied by a slight difference in axial length resulting from a machining error.

In other words, when the outer portion of each sun gear is slightly longer than the inner portion of the sun gear, if the center washer is moved toward one side in the axial direction by a thrust force, the outer portion of the sun gear on this side is subjected to a stronger thrust force than the inner portion of the sun gear. When the inner portion is slightly longer than the outer portion, the inner portion is subjected to a stronger thrust force than the outer portion. Due to a difference in diameter between the inner portion and the outer portion, resultant rotational resistance, that is, the resultant differential limiting force, may vary between the inner and outer portions even when the inner and outer portions are subjected to a thrust force of the same magnitude. Thus, the differential limiting force is likely to vary (differences among individual products).

SUMMARY OF THE INVENTION

An object of the invention is to provide a vehicular differential apparatus that suppresses a variation in differential limiting force and also reduces the number of components and assembly man-hours.

According to an aspect of the invention, a vehicular differential apparatus that distributes a driving force of a vehicle between paired output shafts, the vehicular differential apparatus including: a differential case to which the driving force is input, a plurality of pinion gears that is rotationally held in the differential case and that is revolved by rotation of the differential case, a first output portion and a second output portion housed coaxially in the differential case so as to be rotatable relative to the differential case to transmit the driving force transmitted from the differential case via the pinion gears to the respective output shafts; and an intermediate member disposed between the first output portion and the second output portion. The first output portion has a first coupling member coupled to a first output shaft of the paired output shafts so as not to be rotatable relative to the first output shaft and a first side gear interposed between the first coupling member and the pinion gears, and the first coupling member is engaged with the first side gear via helical teeth. The second output portion has a second coupling member coupled to a second output shaft of the paired output shafts so as not to be rotatable relative to the second output shaft and a second side gear interposed between the second coupling member and the pinion gears, and the second coupling member is engaged with the second side gear via helical teeth. The differential case has a tubular portion inside which the first output portion and the second output portion are disposed along with the intermediate member, a first sidewall portion positioned so as to sandwich the first output portion between the first sidewall portion and the intermediate member, and a second sidewall portion positioned so as to sandwich the second output portion between the second sidewall portion and the intermediate member. A clearance through which the first coupling member is movable in an axial direction between the intermediate member and the first sidewall portion is different in axial width from a clearance through which the first side gear is movable in the axial direction between the intermediate member and the first sidewall portion, and a clearance through which the second coupling member is movable in the axial direction between the intermediate member and the second sidewall portion is different in axial width from a clearance through which the second side gear is movable in the axial direction between the intermediate member and the second sidewall portion.

The vehicular differential apparatus according to the invention enables suppressing a variation in differential limiting force and also reducing the number of components and assembly man-hours.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the invention will be described with reference to FIGS. 1 to 6.

Figure 1:
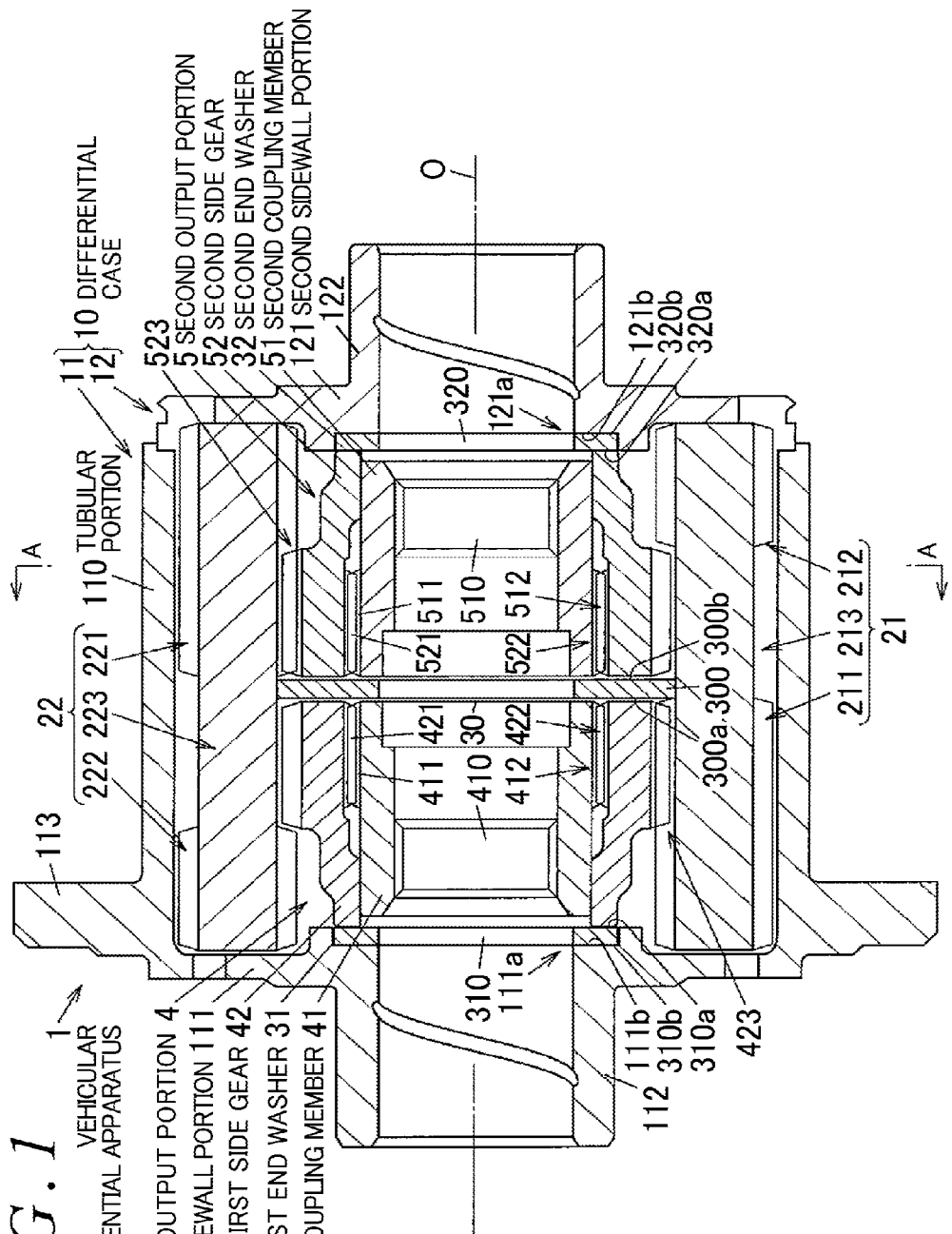
FIG. 1 is a sectional view of a configuration example of a vehicular differential apparatus according to a first embodiment of the invention.
Figure 2:
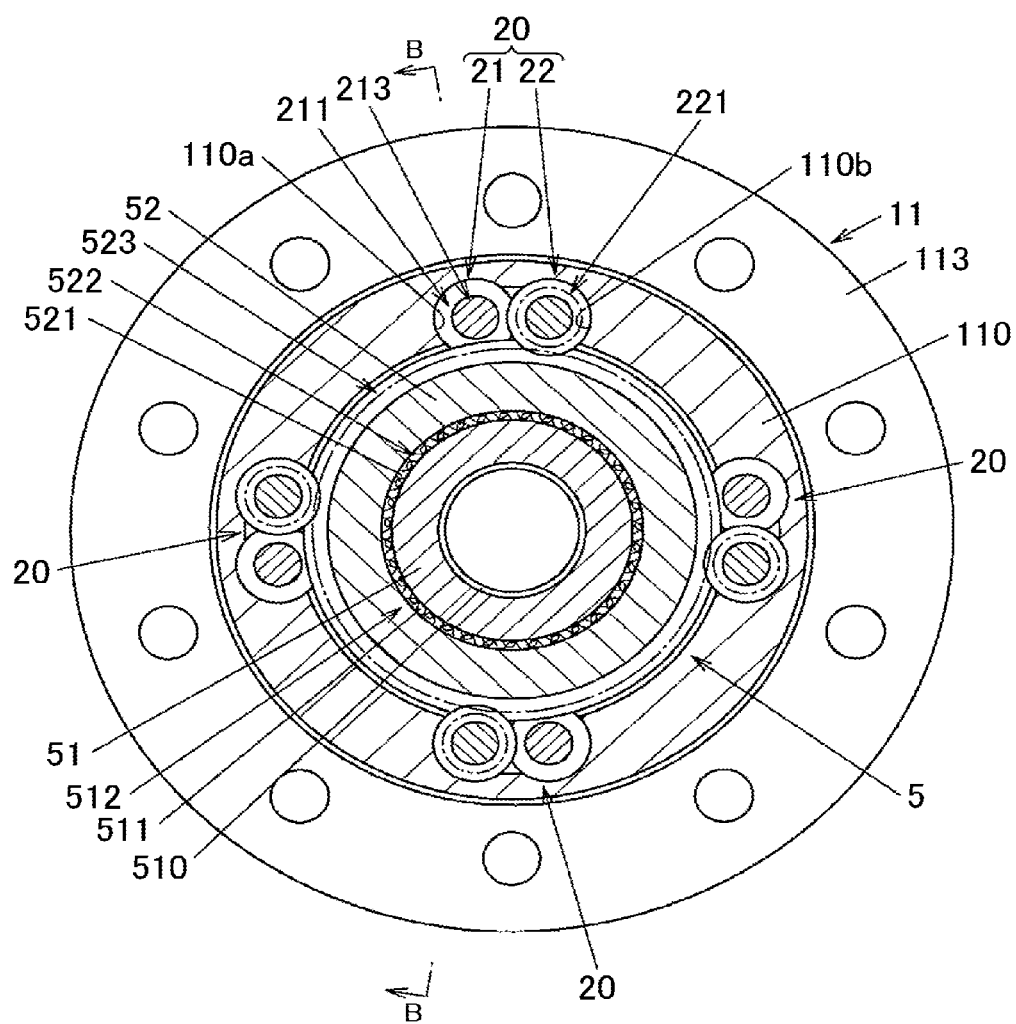
FIG. 2 is a sectional view taken along line A-A in FIG. 1.
Figure 3:
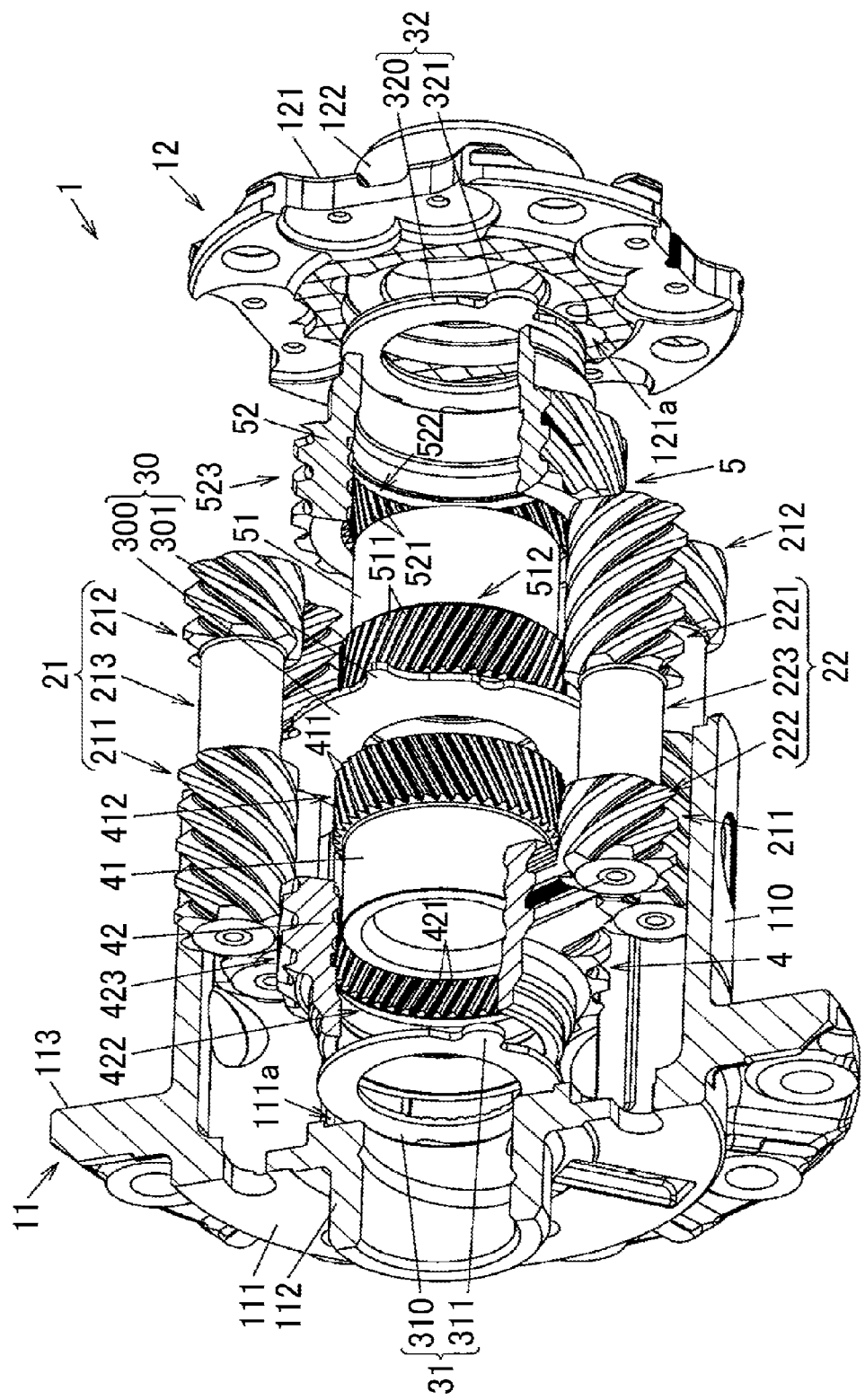
FIG. 3 is an exploded perspective view of a vehicular differential apparatus.

FIG. 1 is a sectional view depicting a configuration example of a vehicular differential apparatus according to the first embodiment of the invention. FIG. 2 is a sectional view taken along line A-A in FIG. 1. FIG. 3 is an exploded perspective view of the vehicular differential apparatus.

The vehicular differential apparatus 1 is used to distribute a driving force of a driving source of a vehicle between paired output shafts. The driving source may be an engine or an electric motor. The vehicular differential apparatus 1 according to the present embodiment is used as a differential apparatus that distributes the driving force of the driving source between a right drive wheel and a left drive wheel. The vehicular differential apparatus 1 according to the present embodiment distributes the input driving force between a right and a left drive shafts serving as paired output shafts.

The vehicular differential apparatus 1 has a differential case 10 to which the driving force is input, a plurality of pinion gears 21, 22 that is rotatably held in the differential case 10 and that is revolved by rotation of the differential case 10, and a first output portion 4 and a second output portion 5 that transmit the driving force transmitted from the differential case 10 via the pinion gears 21, 22 to the respective output shafts. The differential case 10 has a differential case body 11 and a differential case cover 12 disposed so as to close an opening in the differential case body 11.

The differential case body 11 integrally has a tubular portion 110 shaped like a cylinder, a first sidewall portion 111 formed so as to close one end of the tubular portion 110 in an axial direction, a cylindrical extending portion 112 extending outward from a central portion of the first sidewall portion 111, and a flange portion 113 formed to project outward from an outer peripheral surface of the tubular portion 110. A ring gear not depicted in the drawings is fixed to the flange portion 113. The driving force of the driving source is transmitted to the differential case 10 through the ring gear. The differential case 10 is rotated around a rotation axis O by the input driving force. A direction parallel to the rotation axis O is hereinafter referred to as the axial direction.

The differential case cover 12 integrally has a disc-shaped second sidewall portion 121 and a cylindrical extending portion 122 extending outward from a central portion of the second sidewall portion 121. An outer peripheral end of the second sidewall portion 121 is fixed by welding to an end of the tubular portion 110 of the differential case body 11 that is opposite to the first sidewall portion 111.

The vehicular differential apparatus 1 has a center washer 30, a first end washer 31, and a second end washer 32. The center washer 30 is a form of an intermediate member in the invention and is disposed between a first output portion 4 and a second output portion 5. The first end washer 31 is provided on the first sidewall portion 111 of the differential case 10 so as to serve as a first friction portion and disposed on a side of the first output portion 4 remote from the center washer 30 (on a side of the differential case body 11 close to the first sidewall portion 111). The second end washer 32 is provided on the second sidewall portion 121 of the differential case 10 so as to serve as a second friction portion and disposed on a side of the second output portion 5 remote from the center washer 30 (on a side of the differential case cover 12 close to the second sidewall portion 121).

The center washer 30, the first end washer 31, and the second end washer 32 are each shaped like a flat plate having a predetermined thickness in a direction parallel to the rotation axis O of the differential case 10. The center washer 30 has an annular body portion 300 and a plurality of protruding portions 301 formed to protrude outward from the body portion 300 (only one of the protruding portions 301 is depicted in FIG. 3).

The body portion 300 of the center washer 30 has a first side surface 300a facing the first output portion 4 and a second side surface 300b facing the second output portion 5. The protruding portions 301 of the center washer 30 engage with coupling portions 213, 223 of a first pinion gear 21 and a second pinion gear 22, respectively, which will be described below, so that the center washer 30 is movable in the differential case 10 along the rotation axis O in the axial direction and non-rotatable relative to the differential case 10.

The first end washer 31 is housed in a recessed portion 111a formed in the first sidewall portion 111 of the differential case body 11. The first end washer 31 has an annular body portion 310 and a plurality of protruding portions 311 formed to protrude outward from the body portion 310 (only one of the protruding portions 311 is depicted in FIG. 3). The protruding portions 311 engage with the first sidewall portion 111 of the differential case body 11 to prevent the first end washer 31 from rotating with respect to the differential case 10. The body portion 310 of the first end washer 31 has a first side surface 310a facing the first output portion 4 in the axial direction and a second side surface 310b in contact with a bottom surface 111b of the recessed portion 111a.

The second end washer 32 is housed in a recessed portion 121a formed in the second sidewall portion 121 of the differential case cover 12. The second end washer 32 has an annular body portion 320 and a plurality of protruding portions 321 formed to protrude outward from the body portion 320 (only one of the protruding portions 321 is depicted in FIG. 3). The protruding portions 321 engage with the second sidewall portion 121 of the differential case cover 12 to prevent the second end washer 32 from rotating with respect to the differential case 10. The body portion 320 of the second end washer 32 has a first side surface 320a facing the second output portion 5 in the axial direction and a second side surface 320b in contact with a bottom surface 121b of the recessed portion 121a.

The first output portion 4 and the second output portion 5 are disposed inside the tubular portion 110 of the differential case body 11 together with the center washer 30 and along the rotation axis O of the differential case 10 so as to sandwich the center washer 30 between the first output portion 4 and the second output portion 5. The first sidewall portion 111 of the differential case body 11 is positioned so as to sandwich the first output portion 4 between the first sidewall portion 111 and the center washer 30. The second sidewall portion 121 of the differential case cover 12 is positioned so as to sandwich the second output portion 5 between the second sidewall portion 121 and the center washer 30. The first output portion 4 and the second output portion 5 are housed in the differential case 10 inside the pinion gears 21, 22 and are coaxial with the differential case 10 and rotatable relative to the differential case 10.

The first output portion 4 has a first coupling member 41 coupled to a first output shaft of the paired output shafts so as not to be rotatable relative to the first output shaft and a first side gear 42 interposed between the first coupling member 41 and each of the pinion gears 21, 22. The first coupling member 41 and the first side gear 42 are both cylindrical, and the first side gear 42 is disposed on an outer periphery of the first coupling member 41.

A straight spline fitting portion 410 is provided on an inner periphery of the first coupling member 41. An end of a drive shaft that transmits the driving force to, for example, a front left wheel is coupled to the straight spline fitting portion 410 so as not to be rotatable relative to the straight spline fitting portion 410. On an outer periphery of the first coupling member 41, an inclined spline fitting portion 412 is provided which includes a plurality of outer-peripheral helical teeth 411 each having a tooth trace inclined to the axial direction.

On an inner periphery of the first side gear 42, an inclined spline fitting portion 422 is provided which includes a plurality of inner-peripheral helical teeth 421 meshing with the outer-peripheral helical teeth 411 provided on the outer periphery of the first coupling member 41. That is, the first coupling member 41 and the first side gear 42 are meshed with each other via the outer-peripheral helical teeth 411 and the inner-peripheral helical teeth 421. On an outer periphery of the first side gear 42, an outer-peripheral tooth portion 423 is provided which is a helical gear having a tooth trace inclined in a direction opposite to the direction in which the inner-peripheral helical teeth 421 are inclined.

The second output portion 5 has a second coupling member 51 coupled to a second output shaft of the paired output shafts so as not to be rotatable relative to the second output shaft and a second side gear 52 interposed between the second coupling member 51 and the pinion gears 21, 22. The second coupling member 51 and the second side gear 52 are both cylindrical, and the second side gear 52 is disposed on an outer periphery of the second coupling member 51.

A straight spline fitting portion 510 is provided on an inner periphery of the second coupling member 51. An end of a drive shaft that transmits the driving force to, for example, a front right wheel is coupled to the straight spline fitting portion 510 so as not to be rotatable relative to the straight spline fitting portion 510. On an outer periphery of the second coupling member 51, an inclined spline fitting portion 512 is provided which includes a plurality of outer-peripheral helical teeth 511 each having a tooth trace inclined to the axial direction.

On an inner periphery of the second side gear 52, an inclined spline fitting portion 522 is provided which includes a plurality of inner-peripheral helical teeth 521 meshing with the outer-peripheral helical teeth 511 provided on the outer periphery of the second coupling member 51. That is, the second coupling member 51 and the second side gear 52 are meshed with each other via the outer-peripheral helical teeth 511 and the inner-peripheral helical teeth 521. On an outer periphery of the second side gear 52, an outer-peripheral tooth portion 523 is provided which is a helical gear having a tooth trace inclined in a direction opposite to the direction in which the inner-peripheral helical teeth 521 are inclined.

The tubular portion 110 of the differential case body 11 holds a plurality of pinion gear sets 20 in which the pinion gears 21, 22 are meshed with each other. The pinion gears 21, 22 forming the pinion gear set 20 are hereinafter referred to as the first pinion gear 21 and the second pinion gear 22, respectively. In the present embodiment, the vehicular differential apparatus 1 includes four pinion gear sets 20. Rotation axes of the first pinion gear 21 and the second pinion gear 22 are parallel to the rotation axis O of the differential case 10.

The first pinion gear 21 integrally has a long gear portion 211, a short gear portion 212, and a coupling portion 213. The coupling portion 213 couples the long gear portion 211 and the short gear portion 212 together in the axial direction. A helical gear is formed on an outer periphery of each of the long gear portion 211 and the short gear portion 212. Similarly, the second pinion gear 22 integrally has a long gear portion 221, a short gear portion 222, and a coupling portion 223. The coupling portion 223 couples the long gear portion 221 and the short gear portion 222 together in the axial direction. A helical gear is formed on an outer periphery of each of the long gear portion 221 and the short gear portion 222.

In the first pinion gear 21, the long gear portion 211 meshes with the outer-peripheral tooth portion 423 of the first side gear 42 and the short gear portion 222 of the second pinion gear 22, and the short gear portion 212 meshes with the long gear portion 221 of the second pinion gear 22. In the second pinion gear 22, the long gear portion 211 meshes with the outer-peripheral tooth portion 523 of the second side gear 52 and the short gear portion 212 of the first pinion gear 21, and the short gear portion 222 meshes with the long gear portion 211 of the first pinion gear 21.

As depicted in FIG. 2, the first pinion gear 21 is housed in a first housing portion 110a formed in the tubular portion 110 of the differential case 10. The second pinion gear 22 is housed in a second housing portion 110b also formed in the tubular portion 110 of the differential case 10. The first housing portion 110a and the second housing portion 110b partly communicate with each other. In this communication portion, the long gear portion 211 of the first pinion gear 21 meshes with the short gear portion 222 of the second pinion gear 22, and the short gear portion 212 of the first pinion gear 21 meshes with the long gear portion 221 of the second pinion gear 22. A section depicted in FIG. 1 is taken along line B-B in FIG. 2.

While the vehicle is traveling straight ahead, the first and second pinion gears 21, 22 revolve along with the differential case 10 without rotating in the first housing portion 110a and the second housing portion 110b, respectively, of the differential case body 11. While the vehicle is turning, the first and second pinion gears 21, 22 revolve along with the differential case 10 while rotating in the first housing portion 110a and the second housing portion 110b, respectively, of the differential case 10. A driving force input to the differential case 10 is transmitted to the first side gear 42 and the second side gear 52 via the pinion gear sets 20 and further to the output shafts via the first coupling member 41 and the second coupling member 51.

In this case, the outer-peripheral tooth portion 423 of the first side gear 42 is meshed with the long gear portion 211 of the first pinion gear 21 to receive a thrust force in the axial direction. The outer-peripheral tooth portion 523 of the second side gear 52 is meshed with the long gear portion 221 of the second pinion gear 22 to receive a thrust force in the axial direction.

In the first output portion 4, the outer-peripheral helical teeth 411 of the first coupling member 41 meshes with the inner-peripheral helical teeth 421 of the first side gear 42 to generate a thrust force that presses the first coupling member 41 and the first side gear 42 along the rotation axis O in opposite directions. Similarly, in the second output portion 5, the outer-peripheral helical teeth 511 of the second coupling member 51 meshes with the inner-peripheral helical teeth 521 of the second side gear 52 to generate a thrust force that presses the second coupling member 51 and the second side gear 52 along the rotation axis O in opposite directions.

These thrust forces cause friction to generate rotational resistance between the center washer 30 and each of the first coupling member 41 and the first side gear 42 of the first output portion 4, between the first end washer 31 and each of the first coupling member 41 and the first side gear 42, between the center washer 30 and each of the second coupling member 51 and the second side gear 52 of the second output portion 5, and between the second end washer 32 and each of the second coupling member 51 and the second side gear 52. The rotational resistance acts as a differential limiting force to limit a differential between the right wheel and the left wheel. This enhances the straight-ahead traveling capability and thus the traveling stability of the vehicle, and restrains one of the right and left wheels from slipping and running idly.

Reaction forces against the thrust forces acting on the first and second side gears 42, 52 cause the first and second pinion gears 21, 22 to be slightly moved in the axial direction in the first housing portion 110a and the second housing portion 110b, respectively, and pressed against axial end surfaces of the first housing portion 110a and the second housing portion 110b.

In the present embodiment, in the first output portion 4, the first coupling member 41 is different in axial length from the first side gear 42. In the second output portion 5, the second coupling member 51 is different in axial length from the second side gear 52. When one of the first coupling member 41 and the first side gear 42 that has a longer axial length is referred to as a first axially long member and the other of the first coupling member 41 and the first side gear 42 that has a shorter axial length is referred to as a first axially short member, in the present embodiment, the first side gear 42 is the first axially long member, and the first coupling member 41 is the first axially short member. When one of the second coupling member 51 and the second side gear 52 that has a longer axial length is referred to as a second axially long member and the other of the second coupling member 51 and the second side gear 52 that has a shorter axial length is referred to as a second axially short member, in the present embodiment, the second side gear 52 is the second axially long member, and the second coupling member 51 is the second axially short member.

When an axial dimension between a bottom surface 111b of the recessed portion 111a of the first sidewall portion 111 of the differential case 10 and a bottom surface 121b of the recessed portion 121a of the second sidewall portion 121 is denoted by D1 and a dimension that is the sum of the axial lengths of the first axially long member and the second axially long member and the axial thicknesses of the center washer 30, the first end washer 31, and the second end washer 32 is denoted by D2, D1 is slightly larger than D2. Consequently, in the axial direction of the first side gear 42 and the first coupling member 41 of the first output portion 4 and the second side gear 52 and the second coupling member 51 of the second output portion 5, clearances are formed which make these members rotatable.

A neutral state is defined to be a state where the side surface 310b of the first end washer 31 is in contact with the bottom surface 111b of the recessed portion 111a of the first sidewall portion 111, the side surface 320b of the second end washer 32 is in contact with the bottom surface 121b of the recessed portion 121a of the second sidewall portion 121, and the center washer 30 is positioned midway between the first end washer 31 and the second end washer 32. In the neutral state, the axial width of the clearance through which the first coupling member 41 is movable between the center washer 30 and the first sidewall portion 111 is different from the axial width of the clearance through which the first side gear 42 is movable between the center washer 30 and the first sidewall portion 111. In the neutral state, the axial width of the clearance through which the second coupling member 51 is movable between the center washer 30 and the second sidewall portion 121 is also different from the axial width of the clearance through which the second side gear 52 is movable between the center washer 30 and the second sidewall portion 121.

Figure 4:
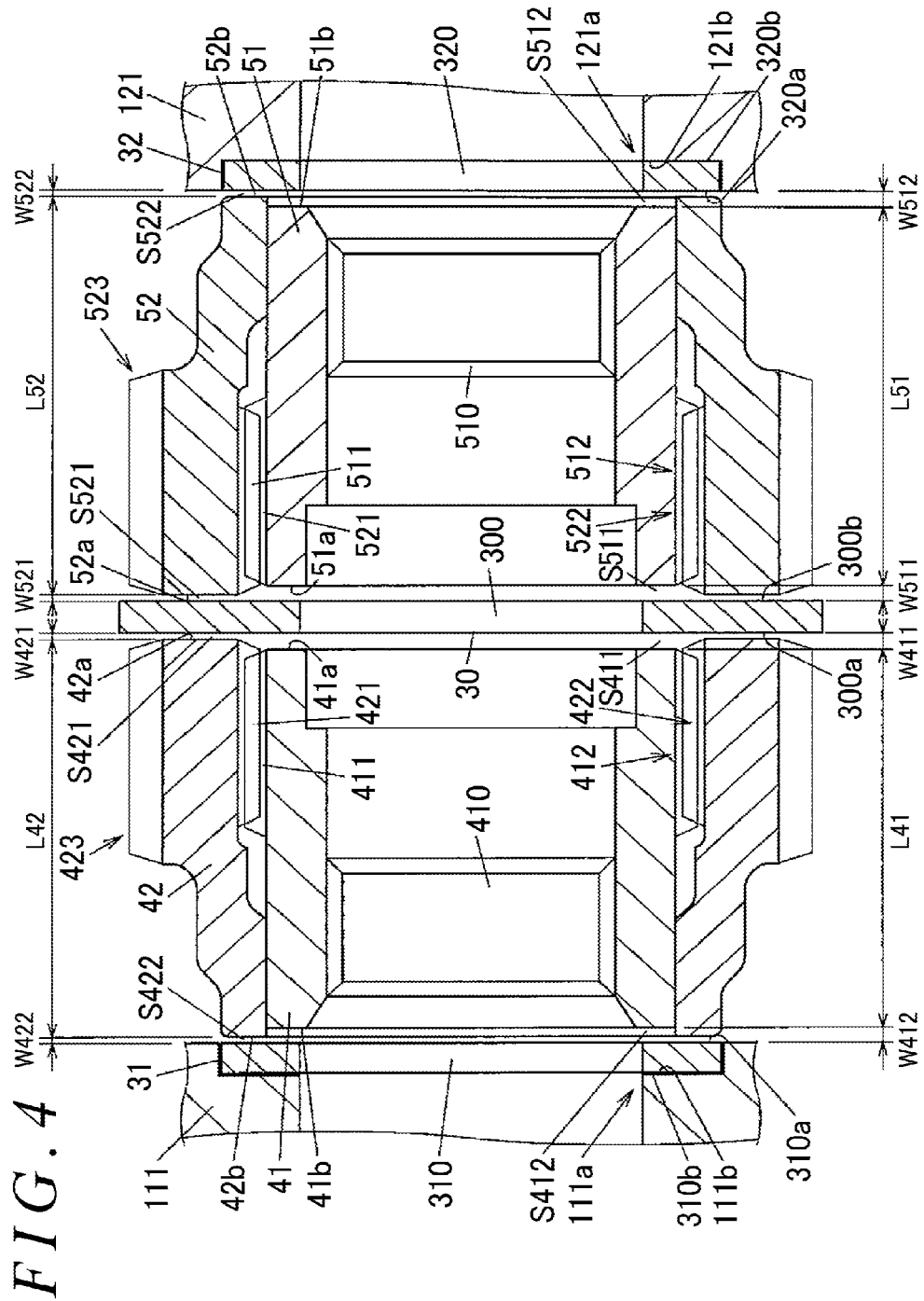
FIG. 4 is a state diagram depicting a first coupling member, a first side gear, a second coupling member, and a second side gear in a neutral state along with a center washer, a first end washer, and a second end washer.

FIG. 4 is a state diagram depicting the first coupling member 41, the first side gear 42, the second coupling member 51, and the second side gear 52 in the neutral state along with the center washer 30, the first end washer 31, and the second end washer 32.

In the present embodiment, the axial length L42 of the first side gear 42 is larger than the axial length L41 of the first coupling member 41, and the axial length L52 of the second side gear 52 is larger than the axial length L51 of the second coupling member 51. Thus, in the neutral state, the axial width of the clearance through which the first coupling member 41 is movable in the axial direction is larger than the axial width of the clearance through which the first side gear 42 is movable in the axial direction. The axial width of the clearance through which the second coupling member 51 is movable in the axial direction is larger than the axial width of the clearance through which the second side gear 52 is movable in the axial direction.

In this case, the axial width of the clearance through which the first coupling member 41 is movable in the axial direction is the sum of the axial width W411 of a clearance S411 between the side surface 300a of the center washer 30 and a first axial end surface 41a of the first coupling member 41 and the axial width W412 of a clearance S412 between the side surface 310a of the first end washer 31 and a second axial end surface 41b of the first coupling member 41. The axial width of the clearance through which the first side gear 42 is movable in the axial direction is the sum of the axial width W421 of a clearance S421 between the side surface 300a of the center washer 30 and a first axial end surface 42a of the first side gear 42 and the axial width W422 of a clearance S422 between the side surface 310a of the first end washer 31 and a second axial end surface 42b of the first side gear 42.

The axial width of the clearance through which the second coupling member 51 is movable in the axial direction is the sum of the axial width W511 of a clearance S511 between the side surface 300b of the center washer 30 and a first axial end surface 51a of the second coupling member 51 and the axial width W512 of a clearance S512 between the side surface 320a of the second end washer 32 and a second axial end surface 51b of the second coupling member 51. The axial width of the clearance through which the second side gear 52 is movable in the axial direction is the sum of the axial width W521 of a clearance S521 between the side surface 300b of the center washer 30 and a first axial end surface 52a of the second side gear 52 and the axial width W522 of a clearance S522 between the side surface 320a of the second end washer 32 and a second axial end surface 52b of the second side gear 52.

When the first end washer 31 is disposed in the recessed portion 111a of the first sidewall portion 111 so as to be movable in the axial direction such that a clearance is formed between the bottom surface 111b of the recessed portion 111a and the side surface 310b of the first end washer 31, the axial width of this clearance is also included in the axial width of the clearance through which each of the first coupling member 41 and the first side gear 42 is movable in the axial direction. Similarly, when the second end washer 32 is disposed in the recessed portion 121a of the second sidewall portion 121 so as to be movable in the axial direction such that a clearance is formed between the bottom surface 121b of the recessed portion 121a and the side surface 320b of the second end washer 32, the axial width of this clearance is also included in the axial width of the clearance through which each of the second coupling member 51 and the second side gear 52 is movable in the axial direction.

In the neutral state, an outer clearance width is defined to be each of the axial width of the clearance through which the first side gear 42 is movable in the axial direction and the axial width of the clearance through which the second side gear 52 is movable in the axial direction, and an inner clearance width is defined to be each of the axial width of the clearance through which the first coupling member 41 is movable in the axial direction and the axial width of the clearance through which the second coupling member 51 is movable in the axial direction. In the neutral state, the larger of the outer and inner clearance widths is common to the first output portion 4 and the second output portion 5. In the present embodiment, since the first side gear 42 is larger in axial length than the first coupling member 41 and the second side gear 52 is larger in axial length than the second coupling member 51, the inner clearance width is larger than the outer clearance width in the first output portion 4 and also in the second output portion 5.

In FIG. 1 and FIG. 4, differences in axial length between the first coupling member 41 and the first side gear 42 and between the second coupling member 51 and the second side gear 52 are exaggerated for clarification of description. However, the difference in axial length in each case may be, for example, 0.05 mm or more.

The first side surface 300a of the center washer 30 that faces the first output portion 4 is formed as a first sliding contact surface that comes into sliding contact with the first axial end surface 41a of the first coupling member 41 and the first axial end surface 42a of the first side gear 42. The second side surface 300b of the center washer 30 that faces the second output portion 5 is formed as a second sliding contact surface that comes into sliding contact with the first axial end surface 51a of the second coupling member 51 and the first axial end surface 52a of the second side gear 52.

The first side surface 310a of the first end washer 31 is formed as a sliding contact surface that comes into sliding contact with the second axial end surface 41b of the first coupling member 41 and the second axial end surface 42b of the first side gear 42. The first side surface 320a of the second end washer 32 is formed as a sliding contact surface that comes into sliding contact with the second axial end surface 51b of the second coupling member 51 and the second axial end surface 52b of the second side gear 52.

Figure 5A:
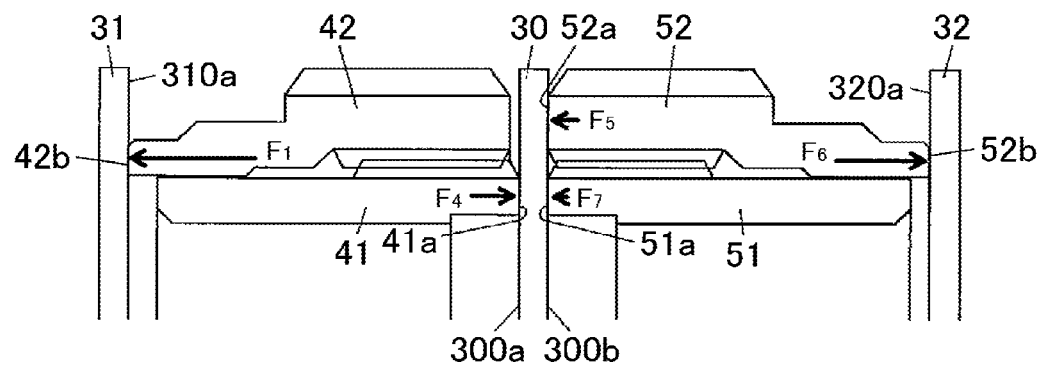
FIG. 5A is a schematic diagram depicting the first coupling member, the first side gear, the second coupling member, and the second side gear along with the center washer, the first end washer, and the second end washer.
Figure 5B:
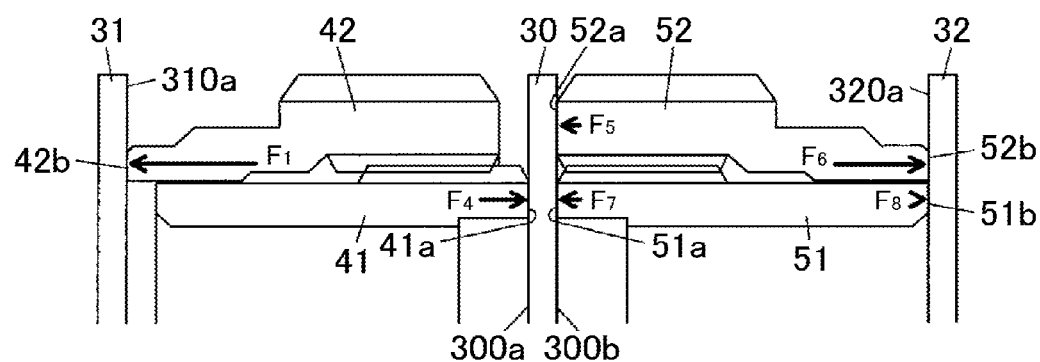
FIG. 5B is a schematic diagram depicting the first coupling member, the first side gear, the second coupling member, and the second side gear along with the center washer, the first end washer, and the second end washer.
Figure 5C:
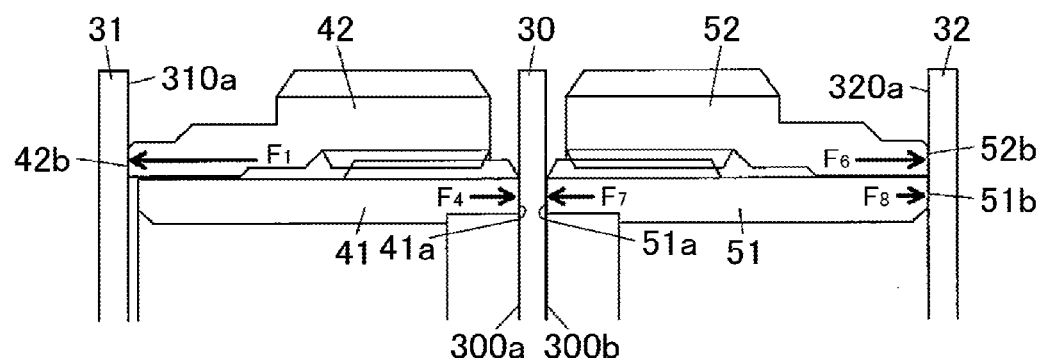
FIG. 5C is a schematic diagram depicting the first coupling member, the first side gear, the second coupling member, and the second side gear along with the center washer, the first end washer, and the second end washer.

Now, effects of the present embodiment will be described with reference to FIGS. 5A to 5C and FIGS. 6A to 6C. FIGS. 5 A to AC and FIGS. 6 A to 6C are schematic diagrams depicting the first coupling member 41, the first side gear 42, the second coupling member 51, and the second side gear 52, along with the center washer 30, the first end washer 31, and the second end washer 32.

Figure 6A:
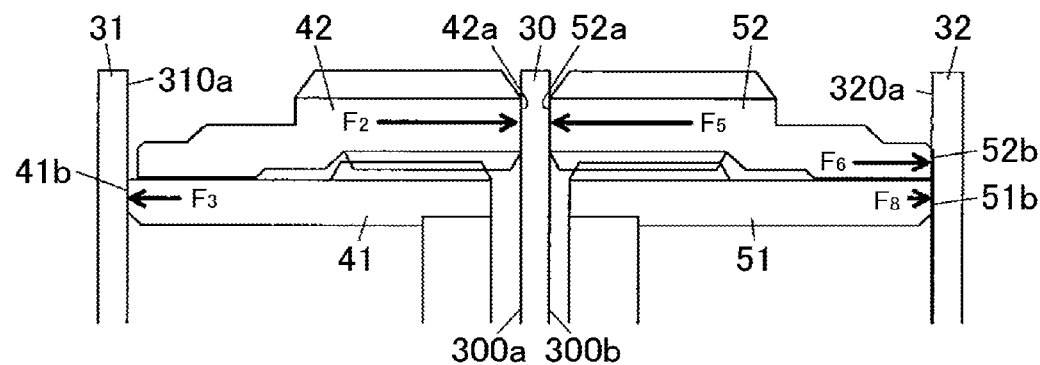
FIG. 6A is a schematic diagram depicting the first coupling member, the first side gear, the second coupling member, and the second side gear along with the center washer, the first end washer, and the second end washer.
Figure 6B:
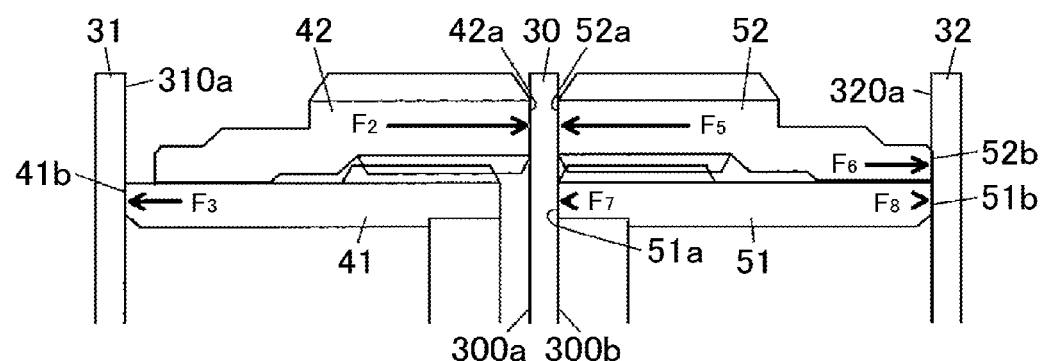
FIG. 6B is a schematic diagram depicting the first coupling member, the first side gear, the second coupling member, and the second side gear along with the center washer, the first end washer, and the second end washer.
Figure 6C:
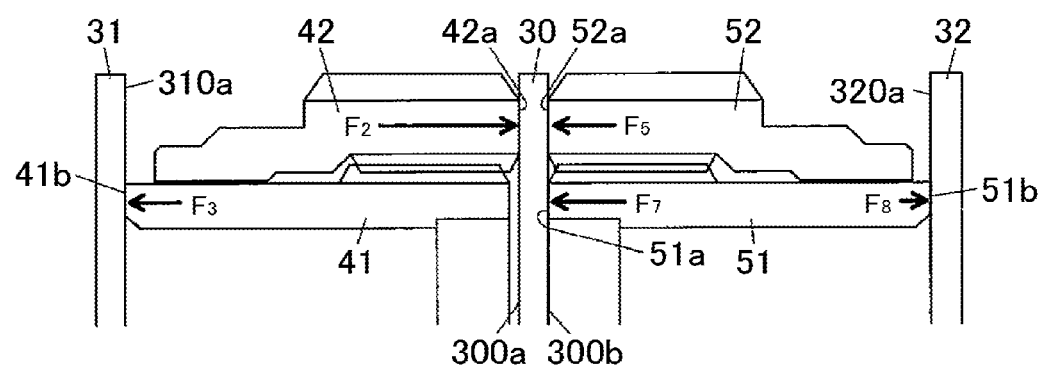
FIG. 6C is a schematic diagram depicting the first coupling member, the first side gear, the second coupling member, and the second side gear along with the center washer, the first end washer, and the second end washer.

FIGS. 5A to 5C illustrate that the vehicular differential apparatus 1 is installed such that, during forward acceleration of the vehicle, both the first side gear 42 and the second side gear 52 are pressed against the center washer 30. FIGS. 6A to 6C illustrate that the vehicular differential apparatus 1 is installed such that, during forward acceleration of the vehicle, both the first side gear 42 and the second side gear 52 are pressed away from the center washer 30. FIGS. 5A to 5C and FIGS. 6A to 6C also illustrate that, for example, a left turn of the vehicle causes a stronger driving force to be transmitted through the first output portion 4, corresponding to an inner side of the turn than through the second output portion 5, corresponding to an outer side of the turn.

FIG. 5A and FIG. 6A illustrate that the first side gear 42 is larger in axial length than the first coupling member 41 and that the second side gear 52 is larger in axial length than the second coupling member 51. Relations between the axial lengths of the first side gear 42 and the first coupling member 41 and between the axial lengths of the second side gear 52 and the second coupling member 51 illustrated in FIG. 1 and FIG. 4 correspond to relations indicated in FIG. 5A and FIG. 6A.

FIG. 5B and FIG. 6B illustrate that the first side gear 42 is identical in axial length to the first coupling member 41 and that the second side gear 52 is identical in axial length to the second coupling member 51. FIG. 5C and FIG. 6C illustrate that the first coupling member 41 is larger in axial length than the first side gear 42 and that the second coupling member 51 is larger in axial length than the second side gear 52.

In FIGS. 5A to 5C and FIGS. 6A to 6C, arrows $F_1$ to $F_8$ illustrate forces by which the first coupling member 41, the first side gear 42, the second coupling member 51, and the second side gear 52 press the center washer 30, the first end washer 31, and the second end washer 32 in the axial direction. The length of each of arrows $F_1$ to $F_8$ represents the magnitude of the corresponding pressing force.

The pressing force by which the first side gear 42 presses the first end washer 31 is denoted by $F_1$. The pressing force by which the first side gear 42 presses the center washer 30 is denoted by $F_2$. The pressing force by which the first coupling member 41 presses the first end washer 31 is denoted by $F_3$. The pressing force by which the first coupling member 41 presses the center washer 30 is denoted by $F_4$. The pressing force by which the second side gear 52 presses the center washer 30 is denoted by $F_5$. The pressing force by which the second side gear 52 presses the second end washer 32 is denoted by $F_6$. The pressing force by which the second coupling member 51 presses the center washer 30 is denoted by $F_7$. The pressing force by which the second coupling member 51 presses the second end washer 32 is denoted by $F_8$.

The center washer 30 moves along the axial direction from one of the first output portion 4 and the second output portion 5 in which a stronger thrust force results from the meshing between each of the first pinion gears 21 and the first side gear 42 or between each of the second pinion gears 22 and the second side gear 52, toward the other of the first output portion 4 and the second output portion 5. In other words, if the thrust force resulting from the meshing between the first side gear 42 in the first output portion 4 and the long gear portion 211 of each of the plurality of (four) first pinion gears 21 is stronger than the thrust force resulting from the meshing between the second side gear 52 in the second output portion 5 and the long gear portion 221 of each of the plurality of (four) second pinion gears 21, the center washer 30 moves toward the second output portion 5. For the opposite magnitude relation between the thrust forces, the center washer 30 moves toward the first output portion 4.

FIGS. 5A to 5C and FIGS. 6A to 6C illustrate that the thrust force resulting from the meshing between the first side gear 42 and each of the first pinion gears 21 is stronger than the thrust force resulting from the meshing between the second side gear 52 and each of the second pinion gears 22.

As depicted in FIG. 5A and FIG. 6A, when the first side gear 42 and the second side gear 52 are larger in axial length than the first coupling member 41 and the second coupling member 51, respectively, a thrust force by which the first coupling member 41 or the first side gear 42 in the first output portion 4 presses the center washer 30 is exerted to press the second output portion 5 in the axial direction. This brings the first axial end surface 52a of the second side gear 52, which is the second axially long member of the second output portion 5, into contact with the side surface 300b of the center washer 30 and brings the second axial end surface 52b into contact with the side surface 320a of the second end washer 32. In this case, the second side gear 52 is subjected to a force that compresses the second side gear 52 in the axial direction, and as a reaction force, applies the pressing force $F_5$ to the center washer 30.

In FIG. 5A, the pressing force $F_4$ by which the first coupling member 41 presses the center washer 30 results from the meshing between the first coupling member 41 and the first side gear 42. The pressing force $F_1$ by which the first side gear 42 presses the first end washer 31 results from the meshing between the first side gear 42 and each of the first pinion gears 21 and the meshing between the first side gear 42 and the first coupling member 41. The pressing force $F_7$ by which the second coupling member 51 presses the center washer 30 results from the meshing between the second coupling member 51 and the second side gear 52. The pressing force $F_5$ by which the second side gear 52 presses the center washer 30 is a reaction force that corresponds to a difference between the pressing force $F_4$ and the pressing force $F_7$ and by which the second side gear 52 presses the center washer 30. The pressing force $F_6$ by which the second side gear 52 presses the second end washer 32 is the total force of the thrust force resulting from the meshing between the second side gear 52 and each of the second pinion gears 22 and a pressing force received by the second side gear 52 from the first output portion 4 via the center washer 30.

In FIG. 6A, the pressing force $F_3$ by which the first coupling member 41 presses the first end washer 31 results from the meshing between the first coupling member 41 and the first side gear 42. The pressing force $F_2$ by which the first side gear 42 presses the center washer 30 results from the meshing between the first side gear 42 and each of the first pinion gears 21 and the meshing between the first side gear 42 and the first coupling member 41. The pressing force $F_8$ by which the second coupling member 51 presses the second end washer 32 results from the meshing between the second coupling member 51 and the second side gear 52. The pressing force $F_6$ by which the second side gear 52 presses the second end washer 32 results from a pressing force received by the second side gear 52 from the first output portion 4 via the center washer 30. The pressing force $F_5$ by which the second side gear 52 presses the center washer 30 is the total force of the thrust force resulting from the meshing between the second side gear 52 and each of the second pinion gears 22 and the pressing force received by the second side gear 52 from the first output portion 4 via the center washer 30.

As depicted in FIG. 5B and FIG. 6B, when the first side gear 42 is equal in axial length to the first coupling member 41 and the second side gear 52 is equal in axial length to the second coupling member 51, a thrust force by which the first coupling member 41 or the first side gear 42 in the first output portion 4 presses the center washer 30 is exerted. This brings the first axial end surface 52a of the second side gear 52 into contact with the side surface 300b of the center washer 30 while bringing the second axial end surface 52b into contact with the side surface 320a of the second end washer 32, and brings the first axial end surface 51a of the second coupling member 51 into contact with the side surface 300b of the center washer 30 while bringing the second axial end surface 51b into contact with the side surface 320a of the second end washer 32.

However, even if the first coupling member 41, the first side gear 42, the second coupling member 51, and the second side gear 52 have the same design value for the axial length, the actual axial lengths may have a slight dimensional variation as a result of a machining error or the like.

For example, the pressing force $F_5$ by which the second side gear 52 presses the center washer 30 is stronger and the pressing force $F_7$ by which the second coupling member 51 presses the center washer 30 is weaker when the second side gear 52 is slightly larger in axial length than the second coupling member 51 than when the second side gear 52 and the second coupling member 51 have completely the same axial length. In contrast, the pressing force $F_5$ by which the second side gear 52 presses the center washer 30 is weaker and the pressing force $F_7$ by which the second coupling member 51 presses the center washer 30 is stronger when the second side gear 52 is slightly smaller in axial length than the second coupling member 51 than when the second side gear 52 and the second coupling member 51 have completely the same axial length.

In this case, since the second side gear 52 is disposed on the outer periphery of the second coupling member 51, even if the second coupling member 51 and the second side gear 52 are pressed against the center washer 30 by the same force, the rotational resistance subjected to the second side gear 52 is higher than the rotational resistance subjected to the second coupling member 51. Therefore, when the first coupling member 41, the first side gear 42, the second coupling member 51, and the second side gear 52 have the same design value for the axial length, a more significant variation (individual difference) in differential limiting force may result from a difference in axial length caused by a machining error or the like.

Thus, in the present embodiment, the first side gear 42 is set larger in axial length than the first coupling member 41, and the second side gear 52 is set larger in axial length than the second coupling member 51. Each of these differences in axial length is set with a possible dimensional error during machining of the first coupling member 41, the first side gear 42, the second coupling member 51, and the second side gear 52 taken into account so that the axially opposite end surfaces of the first coupling member 41 and the first side gear 42 are not in contact with the center washer 30 and the first end washer 31 and that the axially opposite end surfaces of the second coupling member 51 and the second side gear 52 are not in contact with the center washer 30 and the second end washer 32. Consequently, the desired differential limiting force can be generated.

As depicted in FIG. 5C and FIG. 6C, the above-described variation in differential limiting force can also be suppressed by setting the first coupling member 41 larger in axial length than the first side gear 42 and setting the second coupling member 51 larger in axial length than the second side gear 52. In this case, a difference in axial length between the first coupling member 41 and the first side gear 42 and a difference in axial length between the second coupling member 51 and the second side gear 52 are set in view of dimensional errors in the first coupling member 41, the first side gear 42, the second coupling member 51, and the second side gear 52 that may occur during machining so that the axially opposite end surfaces of the first coupling member 41 and the first side gear 42 are not in contact with the center washer 30 and the first end washer 31 and that the axially opposite end surfaces of the second coupling member 51 and the second side gear 52 are not in contact with the center washer 30 and the second end washer 32.

If the first coupling member 41 and the second coupling member 51 are larger in axial length than the first side gear 42 and the second side gear 52, respectively, the thrust force by which the first coupling member 41 or the first side gear 42 of the first output portion 4 presses the center washer 30 brings the first axial end surface of the second coupling member 51, which is the second axially long member of the second output portion 5, into contact with the side surface 300b of the center washer 30, and brings the second axial end surface into contact with the side surface 320a of the second end washer 32.

When the outer clearance width and the inner clearance width are defined as described above, if the first coupling member 41 is set larger in axial length than the first side gear 42 and the second coupling member 51 is set larger in axial length than the second side gear 52 as depicted in FIG. 5C and FIG. 6C, the outer clearance width is larger than the inner clearance width in the first output portion 4, and the outer clearance width is larger than the inner clearance width in the second output portion 5.

In FIG. 5C, the pressing force $F_6$ by which the second side gear 52 presses the second end washer 32 results from the meshing between the second side gear 52 and each of the second pinion gears 22 and between the second side gear 52 and the second coupling member 51. The pressing force $F_7$ by which the second coupling member 51 presses the center washer 30 is a reaction force against the pressing force $F_4$. The pressing force $F_8$ by which the second coupling member 51 presses the second end washer 32 results from the pressing force received by the second coupling member 51 from the first output portion 4 via the center washer 30.

In FIG. 6C, the pressing force $F_5$ by which the second side gear 52 presses the center washer 30 results from the meshing between the second side gear 52 and each of the second pinion gears 22 and between the second side gear 52 and the second coupling member 51. The pressing force $F_7$ by which the second coupling member 51 presses the center washer 30 is a reaction force that corresponds to a difference between the pressing force $F_2$ and the pressing force $F_5$ and by which the second coupling member 51 presses the center washer 30. The pressing force $F_8$ by which the second coupling member 51 presses the second end washer 32 results from the pressing force received by the second coupling member 51 from the first output portion 4 via the center washer 30.

Effects of the first embodiment will be described below. In the present embodiment, since the single center washer 30 is provided, a variation in differential limiting force can be suppressed and the number of components and assembly man-hours can be reduced. The differential limiting force can be made stronger when the first side gear 42 and the second side gear 52 are set larger in axial length than the first coupling member 41 and the second coupling member 51, respectively, than when the first coupling member 41 and the second coupling member 51 are set larger in axial length than the first side gear 42 and the second side gear 52, respectively.

Now, a second embodiment of the invention will be described with reference to FIG. 7 and FIG. 8.

Figure 7:
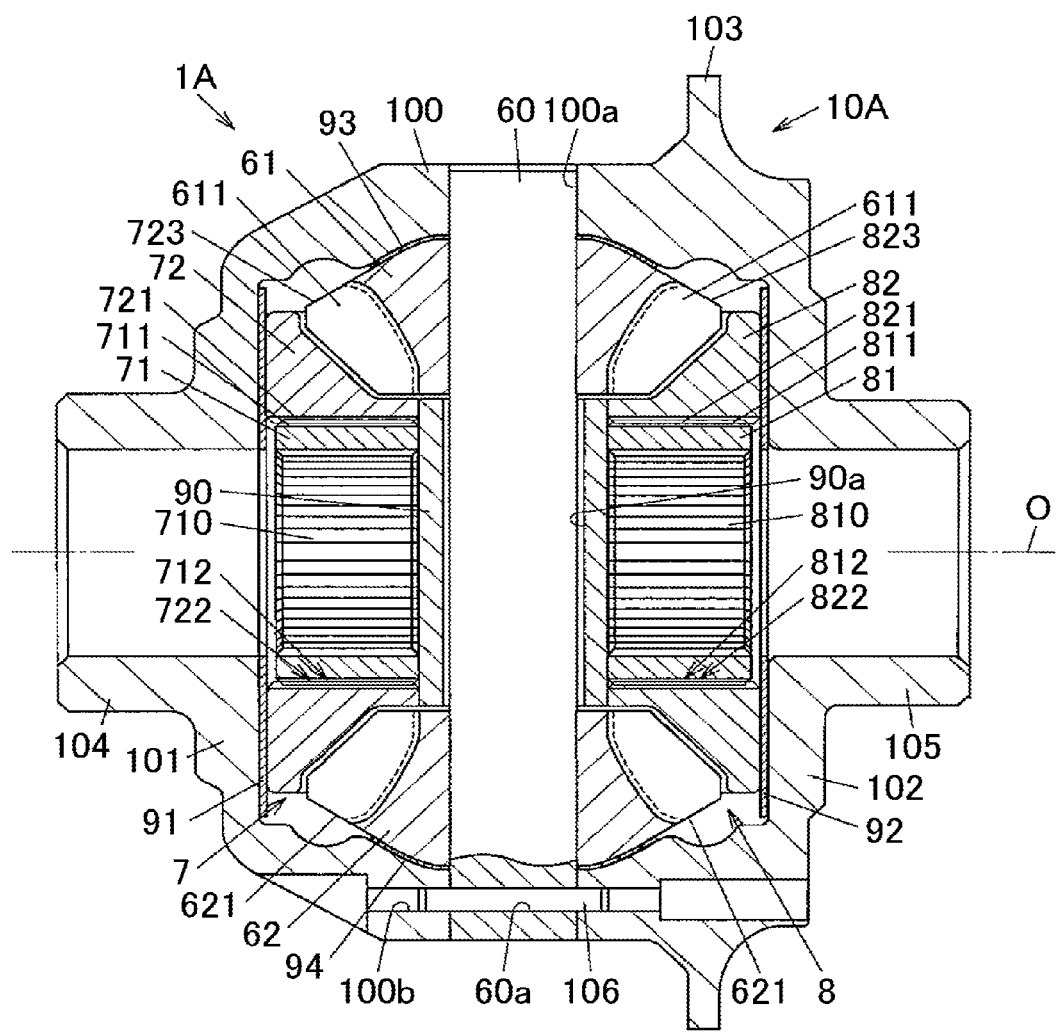
FIG. 7 is a sectional view depicting a configuration example of a vehicular differential apparatus according to a second embodiment of the invention.
Figure 8:
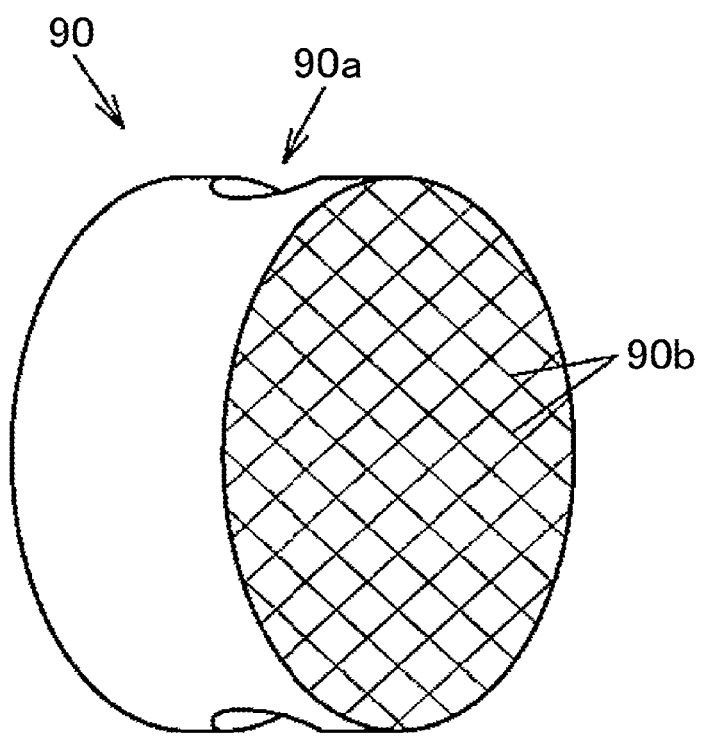
FIG. 8 is a perspective view depicting a spacer serving as an intermediate member included in the vehicular differential apparatus according to the second embodiment.

FIG. 7 is a sectional view depicting a configuration example of a vehicular differential apparatus 1A according to the second embodiment of the invention. FIG. 8 is a perspective view depicting a spacer 90 serving as an intermediate member included in the vehicular differential apparatus 1A.

The vehicular differential apparatus 1A includes a differential case 10A to which a driving force is input, a pinion shaft 60 fixed so as to rotate integrally with the differential case 10A, a first pinion gear 61 and a second pinion gear 62 rotatably supported by the pinion shaft 60, a first output portion 7, a second output portion 8, the spacer 90 serving as the intermediate member in the invention, and a first to a fourth thrust washers 91 to 94.

The differential case 10A integrally has a cylindrical tubular portion 100, a first sidewall portion 101 formed so as to close one end of the tubular portion 100 in the axial direction, a second sidewall portion 102 formed so as to close the other end of the tubular portion 100 in the axial direction, an annular flange portion 103 protruding from an outer peripheral surface of the tubular portion 100, a cylindrical extending portion 104 extending outward from a central portion of the first sidewall portion 101, and a cylindrical extending portion 105 extending outward from a central portion of the second sidewall portion 102.

The pinion shaft 60 is inserted through an insertion hole 100a formed in the tubular portion 100 of the differential case 10A and retained with a retaining pin 106. The retaining pin 106 is press-fitted in a through-hole 100b that is formed in the tubular portion 110 and is parallel to the rotation axis O of the differential case 10A. The pinion shaft 60 is cylindrical and has a center axis orthogonal to the rotation axis O. The retaining pin 106 penetrates a radial hole 60a formed in the pinion shaft 60.

The first pinion gear 61 and the second pinion gear 62 are bevel gears, and are rotatably held by the differential case 10A and revolved by rotation of the differential case 10A.

The first output portion 7 and the second output portion 8 are disposed inside the tubular portion 100 of the differential case 10A and along the rotation axis O of the differential case 10A such that the spacer 90 is sandwiched between the first output portion 7 and the second output portion 8. The first sidewall portion 101 of the differential case 10A is positioned so as to sandwich the first output portion 7 between the first sidewall portion 101 and the spacer 90. The second sidewall portion 102 is positioned so as to sandwich the second output portion 8 between the second sidewall portion 102 and the spacer 90.

The first output portion 7 has a cylindrical first coupling member 71 and a first side gear 72 interposed between the first coupling member 71 and the first and second pinion gears 61, 62. A straight spline fitting portion 710 is provided on an inner periphery of the first coupling member 71. The straight spline fitting portion 710 couples to an end of a drive shaft serving as, for example, an output shaft that transmits a driving force to the front left wheel such that the drive shaft is not rotatable relative to the straight spline fitting portion 710. On an outer periphery of the first coupling member 71, an inclined spline fitting portion 712 is provided which includes a plurality of outer-peripheral helical teeth 711 each having a tooth trace inclined to the axial direction.

On an inner periphery of the first side gear 72, an inclined spline fitting portion 722 is provided which includes a plurality of inner-peripheral helical teeth 721 meshing with the outer-peripheral helical teeth 711 provided on the outer periphery of the first coupling member 71. On an outer peripheral surface of the first side gear 72, a plurality of gear teeth 723 is formed which meshes with a plurality of gear teeth 611 of the first pinion gear 61 and a plurality of gear teeth 621 of the second pinion gear 62.

The second output portion 8 has a cylindrical second coupling member 81 and a second side gear 82 interposed between the second coupling member 81 and the first and second pinion gears 61, 62. A straight spline fitting portion 810 is provided on an inner periphery of the second coupling member 81. The straight spline fitting portion 810 couples to an end of a drive shaft serving as, for example, an output shaft that transmits a driving force to the front right wheel such that the drive shaft is not rotatable relative to the straight spline fitting portion 810. On an outer periphery of the second coupling member 81, an inclined spline fitting portion 812 is provided which is a plurality of outer-peripheral helical teeth 811 each having a tooth trace inclined to the axial direction.

On an inner periphery of the second side gear 82, an inclined spline fitting portion 822 is provided which includes a plurality of inner-peripheral helical teeth 821 meshing with the outer-peripheral helical teeth 811 provided on the outer periphery of the second coupling member 81. On an outer periphery of the second side gear 82, a plurality of gear teeth 823 is formed which meshes with the plurality of gear teeth 611 of the first pinion gear 61 and the plurality of gear teeth 621 of the second pinion gear 62.

The first pinion gear 61, the second pinion gear 62, the first side gear 72, and the second side gear 82 are bevel gears. Each of the first pinion gear 61 and the second pinion gear 62 meshes with the first side gear 72 and the second side gear 82 such that the rotation axis of the first pinion gear 61 and the second pinion gear 62 is orthogonal to the rotation axis of the first side gear 72 and the second side gear 82.

The first thrust washer 91 is interposed between the first sidewall portion 101 of the differential case 10A and both the first coupling member 71 and the first side gear 72. The second thrust washer 92 is interposed between the second sidewall portion 102 of the differential case 10A and both the second coupling member 81 and the second side gear 82. The first thrust washer 91 and the second thrust washer 92 are prevented from rotating with respect to the differential case 10A The third thrust washer 93 is interposed between a gear rear surface of the first pinion gear 61 and the tubular portion 100 of the differential case 10A. The fourth thrust washer 94 is interposed between a gear rear surface of the second pinion gear 62 and the tubular portion 100 of the differential case 10A. The first thrust washer 91 and the second thrust washer 92 are shaped like flat plates. The third thrust washer 93 and the fourth thrust washer 94 are curved along the gear rear surfaces of the first pinion gear 61 and the second pinion gear 62, respectively.

The first coupling member 71 and the first side gear 72 each have a first axial end surface facing the first thrust washer 91 and a second axial end surface facing the spacer 90. The second coupling member 81 and the second side gear 82 each have a first axial end surface facing the second thrust washer 92 and a second axial end surface facing the spacer 90. The spacer 90 is a disc-shaped member and has a through-hole 90a that extends in a radial direction and through which the pinion shaft 60 is inserted. The through-hole 90a has a diameter larger than the diameter of the pinion shaft 60, so that the spacer 90 is rotatable relative to the pinion shaft 60 along the rotation axis O. Lubrication grooves 90b are formed in a side surface of the spacer 90 such that lubricant flows through the lubrication grooves 90b as depicted in FIG. 8.

A driving force input to the differential case 10A is transmitted from the first output portion 7 to a first output shaft via the first and second pinion gears 61, 62 and also transmitted from the second output portion 8 to a second output shaft via the first and second pinion gears 61, 62. At this time, meshing between the outer-peripheral helical teeth 711 and inner-peripheral helical teeth 721 results in a thrust force exerted between the first coupling member 71 and the first side gear 72 to press the first coupling member 71 and the first side gear 72 in the respective opposite directions along the rotation axis O. Meshing between the outer-peripheral helical teeth 811 and inner-peripheral helical teeth 821 results in a thrust force exerted between the second coupling member 81 and the second side gear 82 to press the second coupling member 81 and the second side gear 82 in the respective opposite directions along the rotation axis O.

In the present embodiment, the outer-peripheral helical teeth 711, 811 and the inner-peripheral helical teeth 721, 821 have tooth traces inclined to the axial direction such that, during forward acceleration of the vehicle, the first side gear 72 is pressed toward the first thrust washer 91, and that the second side gear 82 is pressed toward the second thrust washer 92.

The first side gear 72 is different in axial length from the first coupling member 71. The second side gear 82 is different in axial length from the second coupling member 81. Consequently, with the spacer 90 positioned midway between the first sidewall portion 101 and the second sidewall portion 102 of the differential case 10A, a clearance through which the first coupling member 71 is movable in the axial direction between the spacer 90 and the first sidewall portion 101 is different in axial width from a clearance through which the first side gear 72 is movable in the axial direction between the spacer 90 and the first sidewall portion 101. Furthermore, a clearance through which the second coupling member 81 is movable in the axial direction between the spacer 90 and the second sidewall portion 102 is different in axial width from a clearance through which the second side gear 82 is movable in the axial direction between the spacer 90 and the second sidewall portion 102.

FIG. 7 illustrates that the first side gear 72 is larger in axial length than the first coupling member 71 and that the second side gear 82 is larger in axial length than the second coupling member 81. However, in contrast, the first coupling member 71 may be larger in axial length than the first side gear 72, and the second coupling member 81 may be larger in axial length than the second side gear 82.

The spacer 90 moves from one of the first output portion 7 and the second output portion 8 that transmits a stronger driving force, toward the other of the first output portion 7 and the second output portion 8. For example, when the first output portion 7 transmits a stronger driving force than the second output portion 8, the spacer 90 is subjected to an axial pressing force from the first coupling member 71 to press the second output portion 8 toward the second sidewall portion 102. The second side gear 82 is subjected to the pressing force and pressed against the second thrust washer 92, increasing the differential limiting force. At this time, since the second side gear 82 is different in axial length from the second coupling member 81, axially opposite end surfaces of the second side gear 82 and the second coupling member 81 are not in sliding contact with the spacer 90 and the second thrust washer 92.

As described above, in the present embodiment, effects similar to the effects of the first embodiment restrain a variation in differential limiting force from being increased by a slight difference in axial length among the first coupling member 71, the first side gear 72, the second coupling member 81, and the second side gear 82 resulting from a machining error. That is, the present embodiment produces effects similar to the effects of the first embodiment.

The invention can be varied in implementation without departing from the spirits of the invention. For example, in the description of the first embodiment, the first pinion gear 21 and the second pinion gear 22 mesh with each other at two positions at the respective opposite ends of each gear. However, the invention is not limited to this. The first pinion gear 21 and the second pinion gear 22 may mesh with each other at one position at one end of each gear in the axial direction. In the description of the second embodiment, both the first thrust washer 91 and the second thrust washer 92 are flat plates. However, the first thrust washer 91 and the second thrust washer 92 may be curved along with the gear rear surfaces of the first side gear 72 and the second side gear 82 so as to be partially spherical.

In the description of the first embodiment and the second embodiment, the inner clearance width and the outer clearance width are made different from each other by setting the first coupling member 41 different in axial length from the first side gear 42 and setting the second coupling member 51 different in axial length from the second side gear 52. However, the inner clearance width and the outer clearance width may also be made different from each other by varying the thickness of the center washer 30 or the spacer 90 in the direction of the rotation axis between an inner portion thereof that comes into contact with the coupling portion and an outer portion thereof that comes into contact with the side gear.

What is claimed is:

1. A vehicular differential apparatus that distributes a driving force of a vehicle between paired output shafts, the vehicular differential apparatus comprising:
   a differential case to which the driving force is input;
   a plurality of pinion gears that is rotationally held in the differential case and that is revolved by rotation of the differential case;
   a first output portion and a second output portion housed coaxially in the differential case so as to be rotatable relative to the differential case to transmit the driving force transmitted from the differential case via the pinion gears to the respective output shafts; and
   an intermediate member disposed between the first output portion and the second output portion, wherein,
   the first output portion has a first coupling member coupled to a first output shaft of the paired output shafts so as not to be rotatable relative to the first output shaft and a first side gear interposed between the first coupling member and the pinion gears, and the first coupling member is engaged with the first side gear via helical teeth,
   the second output portion has a second coupling member coupled to a second output shaft of the paired output shafts so as not to be rotatable relative to the second output shaft and a second side gear interposed between the second coupling member and the pinion gears, and the second coupling member is engaged with the second side gear via helical teeth,
   the differential case has a tubular portion inside which the first output portion and the second output portion are disposed along with the intermediate member, a first sidewall portion positioned so as to sandwich the first output portion between the first sidewall portion and the intermediate member, and a second sidewall portion positioned so as to sandwich the second output portion between the second sidewall portion and the intermediate member, and
   a clearance through which the first coupling member is movable in an axial direction between the intermediate member and the first sidewall portion is different in axial width from a clearance through which the first side gear is movable in the axial direction between the intermediate member and the first sidewall portion, and a clearance through which the second coupling member is movable in the axial direction between the intermediate member and the second sidewall portion is different in axial width from a clearance through which the second side gear is movable in the axial direction between the intermediate member and the second sidewall portion.

2. The vehicular differential apparatus according to claim 1, wherein, the intermediate member moves along a direction of a rotation axis of the differential case from one of the first output portion and the second output portion in which a stronger thrust force results from meshing between each of the pinion gears and the first side gear or between each of the pinion gears and the second side gear, toward other of the first output portion and the second output portion.

3. The vehicular differential apparatus according to claim 2, wherein, the intermediate member has a first sliding contact surface that faces the first output portion and that comes into sliding contact with an axial end surface of the first coupling member and an axial end surface of the first side gear, and a second sliding contact surface that faces the second output portion and that comes into sliding contact with an axial end surface of the second coupling member and an axial end surface of the second side gear.

4. The vehicular differential apparatus according to claim 2, wherein, in the differential case, the first sidewall portion is provided with a first friction portion having a sliding contact surface that comes into sliding contact with axial end surfaces of the first coupling member and the first side gear that are remoter from the intermediate member, and the second sidewall portion is provided with a second friction portion having a sliding contact surface that comes into sliding contact with axial end surfaces of the second coupling member and the second side gear that are remote from the intermediate member.

5. The vehicular differential apparatus according to claim 1, wherein, the first side gear is disposed on an outer periphery of the first coupling member and the second side gear is disposed on an outer periphery of the second coupling member, and when an axial width of a clearance in the first output portion through which the first coupling member is movable in the axial direction between the intermediate member and the first sidewall portion is referred to as an outer clearance width, and an axial width of a clearance in the first output portion through which the first side gear is movable in the axial direction between the intermediate member and the first sidewall portion is referred to as an inner clearance width, and when an axial width of a clearance in the second output portion through which the second coupling member is movable in the axial direction between the intermediate member and the second sidewall portion is referred to as an outer clearance width, and an axial width of a clearance in the second output portion through which the second side gear is movable in the axial direction between the intermediate member and the second sidewall portion is referred to as an inner clearance width, a larger of the outer clearance width and the inner clearance width is common to the first output portion and the second output portion.

6. The vehicular differential apparatus according to claim 5, wherein, in the first output portion, the inner clearance width is larger than the outer clearance width, and in the second output portion, the inner clearance width is larger than the outer clearance width.

7. The vehicular differential apparatus according to claim 5, wherein, in the first output portion, the outer clearance width is larger than the inner clearance width, and in the second output portion, the outer clearance width is larger than the inner clearance width.

* * * * *